No. 872,900. PATENTED DEC. 3, 1907.
J. P. CLEAL.
CASH REGISTER.
APPLICATION FILED AUG. 29, 1900.

7 SHEETS—SHEET 4.

Witnesses:
Chas. Pleasants
John H. Berkstresser

Inventor.
Joseph P. Cleal
by Edward Rector
his atty

No. 872,900. PATENTED DEC. 3, 1907.
J. P. CLEAL.
CASH REGISTER.
APPLICATION FILED AUG. 29, 1900.
7 SHEETS—SHEET 5.
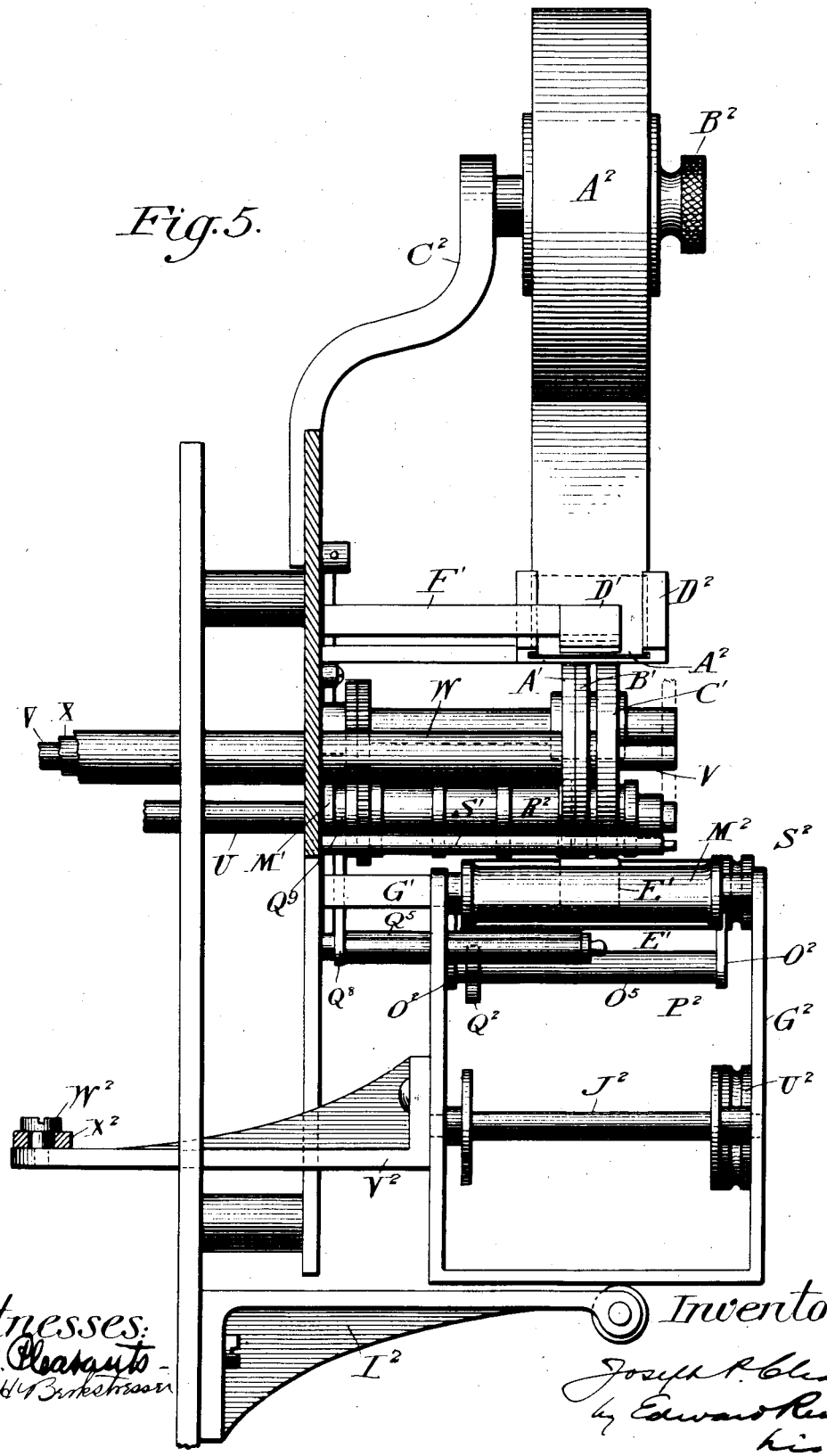
Fig. 5.
Witnesses:
Inventor.

No. 872,900. PATENTED DEC. 3, 1907.
J. P. CLEAL.
CASH REGISTER.
APPLICATION FILED AUG. 29, 1900.
7 SHEETS—SHEET 6.
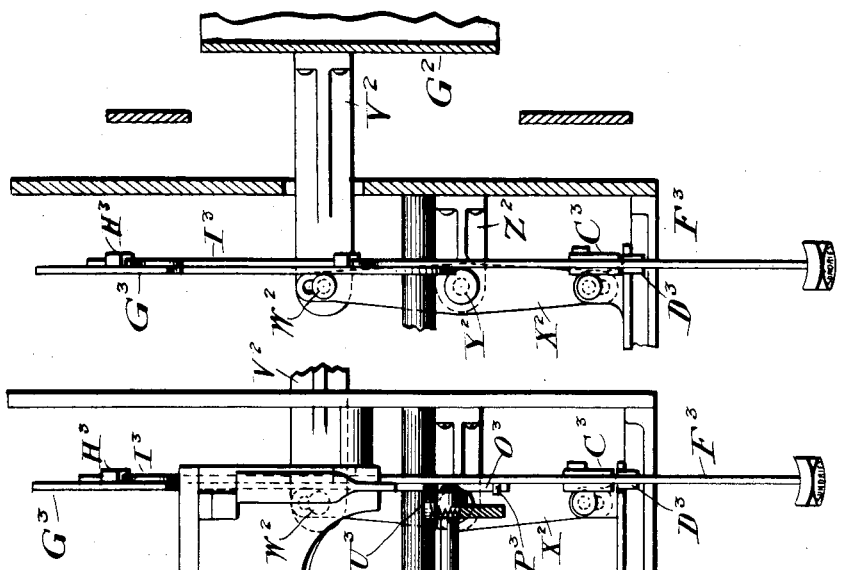
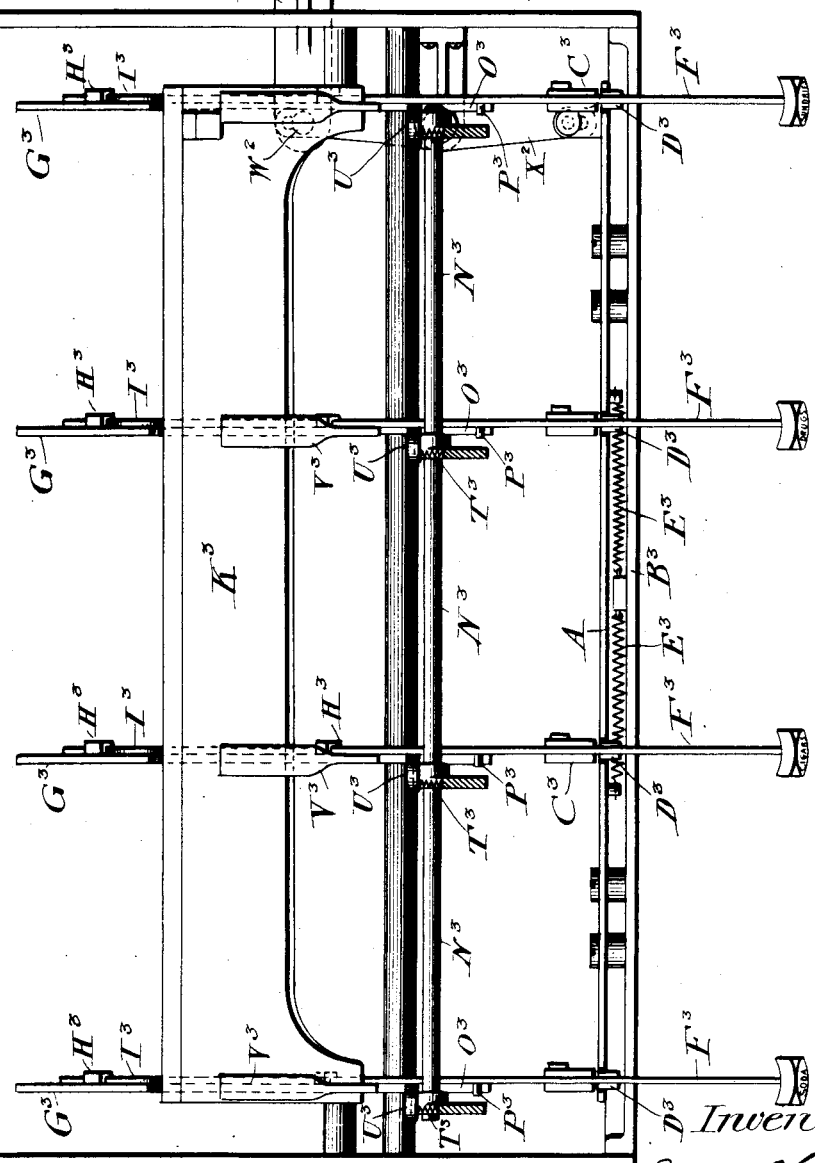

No. 872,900. PATENTED DEC. 3, 1907.
J. P. CLEAL.
CASH REGISTER.
APPLICATION FILED AUG. 29, 1900.
7 SHEETS—SHEET 7.
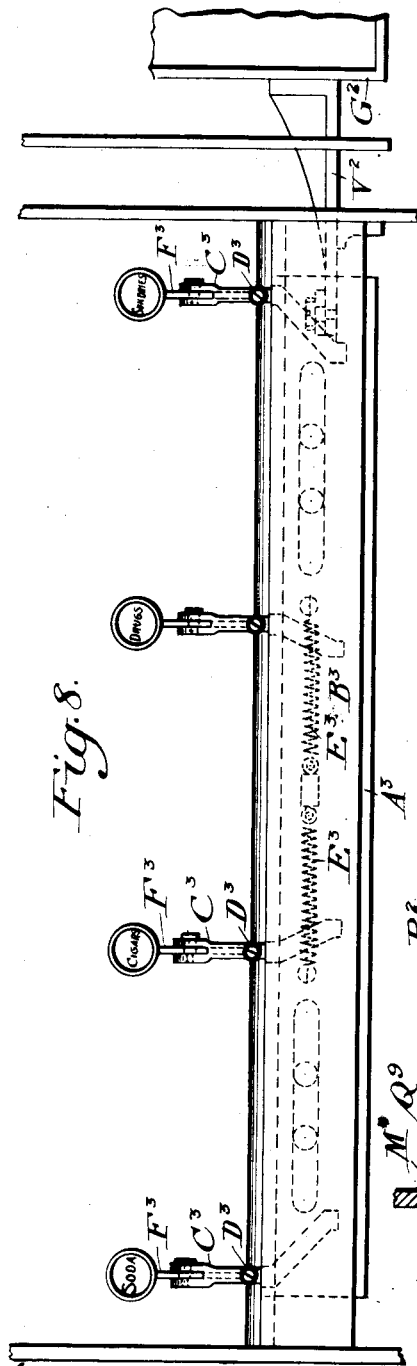
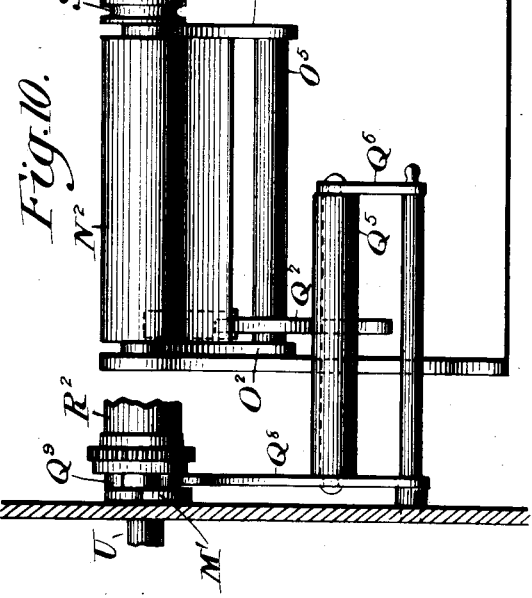
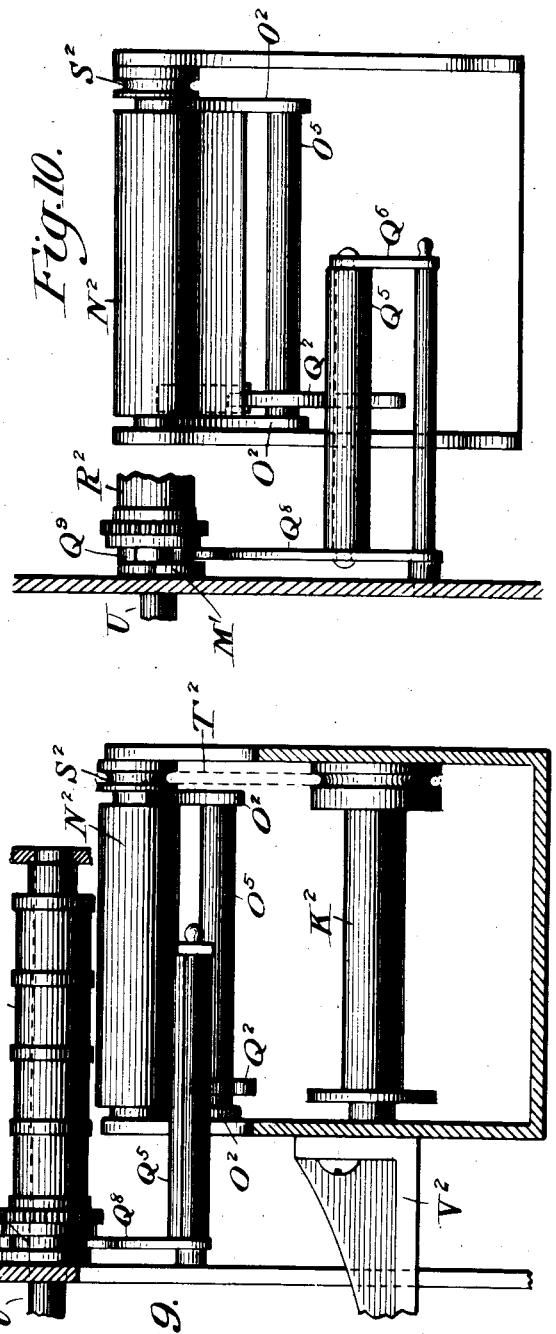

UNITED STATES PATENT OFFICE.

JOSEPH P. CLEAL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

No. 872,900.     Specification of Letters Patent.     Patented Dec. 3, 1907.

Application filed August 29, 1900. Serial No. 28,415.

*To all whom it may concern:*

Be it known that I, JOSEPH P. CLEAL, a citizen of the United States, residing at Dayton, in the county of Montgomery and State of Ohio, have invented a certain new and useful Improvement in Cash-Registers, of which the following is a description, reference being had to the accompanying drawings, forming a part of this specification.

This application covers the same subject matter contained in my prior application filed July 6, 1894, No. 516,691, which application became abandoned by failure to prosecute the same to issue within the time prescribed by the Rules of Practice of the United States Patent Office.

My invention is designed more particularly for use in establishments where several different classes of business are carried on and where the proprietor desires to have not only a record of the aggregate amount of sales but a record of the amount of sales in each class or department. Thus, in a drug store it is often desirable to preserve separate records of the amounts received from sales of drugs, sundries, merchandise, cigars, and soda-water.

It is the object of my invention to provide a cash register with a printing attachment by which the amounts received from each class of sales may be printed upon the record strip in a special column appropriated to such sales, in addition to registering the aggregate amount of the sales of all classes, and it consists in the novel combination of such a printing attachment with the operating keys and other mechanism of a cash register.

In the accompanying drawings my invention has been shown applied to the machine patented to Thomas Carney by Letters Patent No. 497,861, dated May 23, 1893, and will be so described in the following specification, but it is applicable to other widely differing forms of machines and in no way restricted to this special one.

Figure 1:
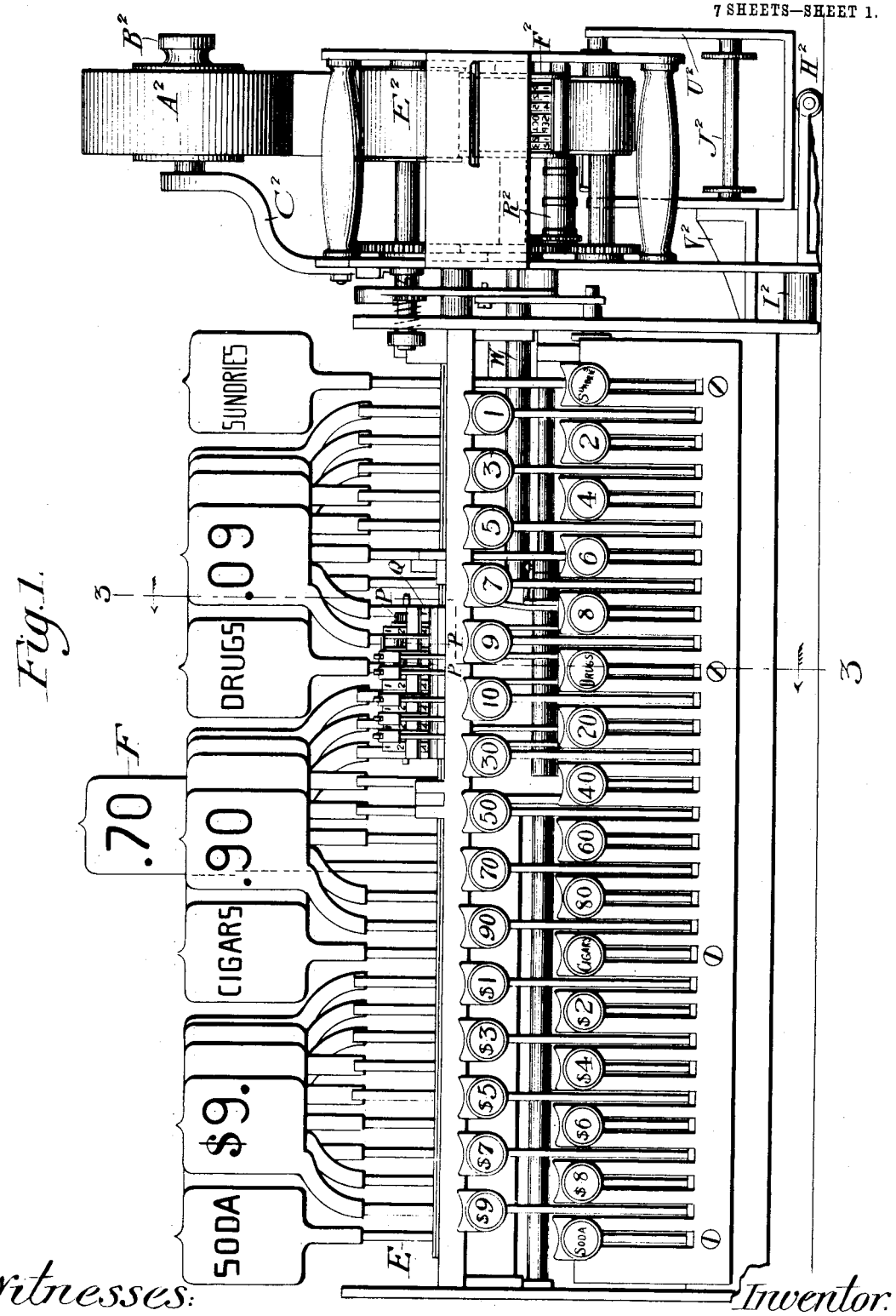
Figure 2:
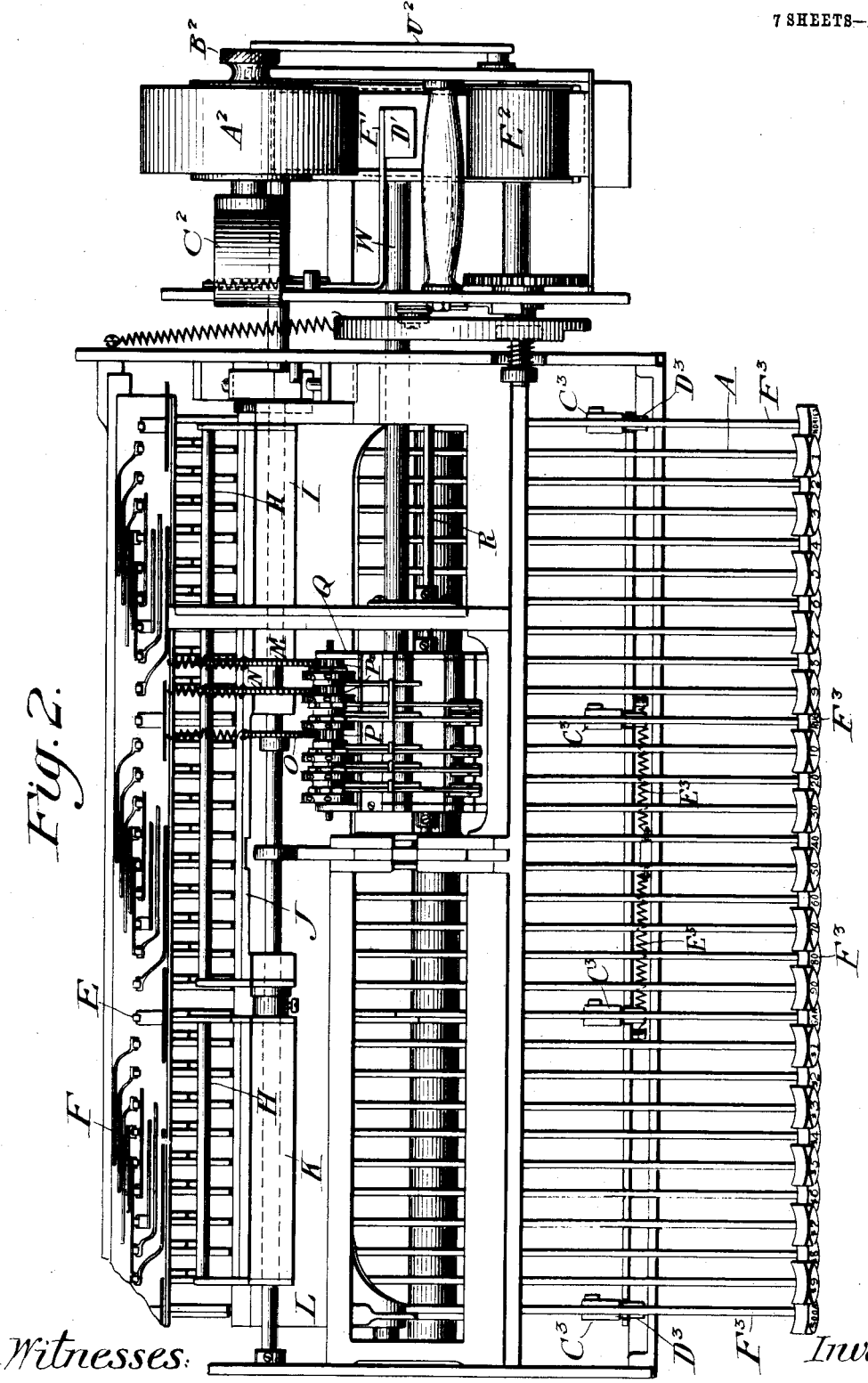
Figure 3:
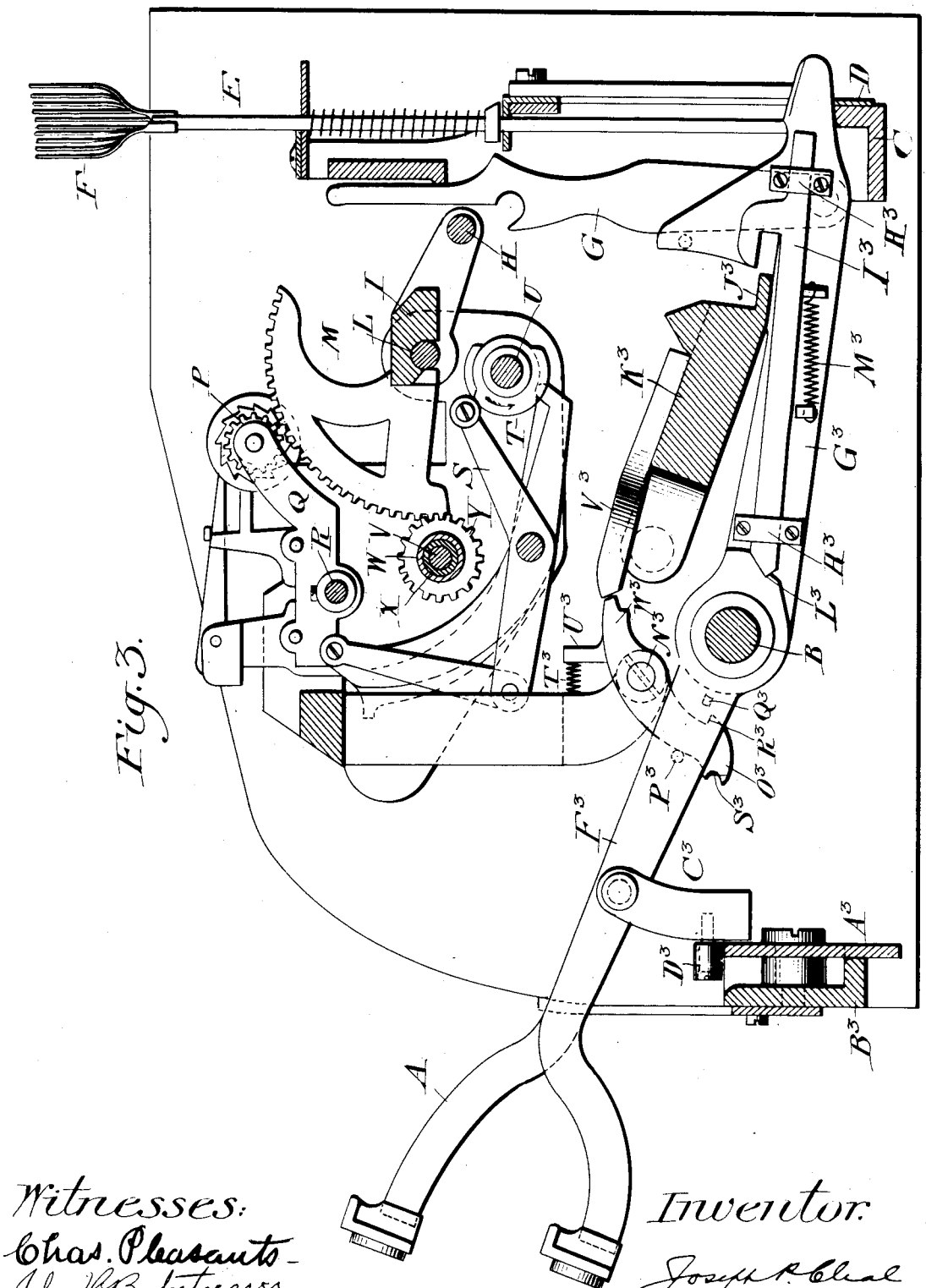
Figure 4:
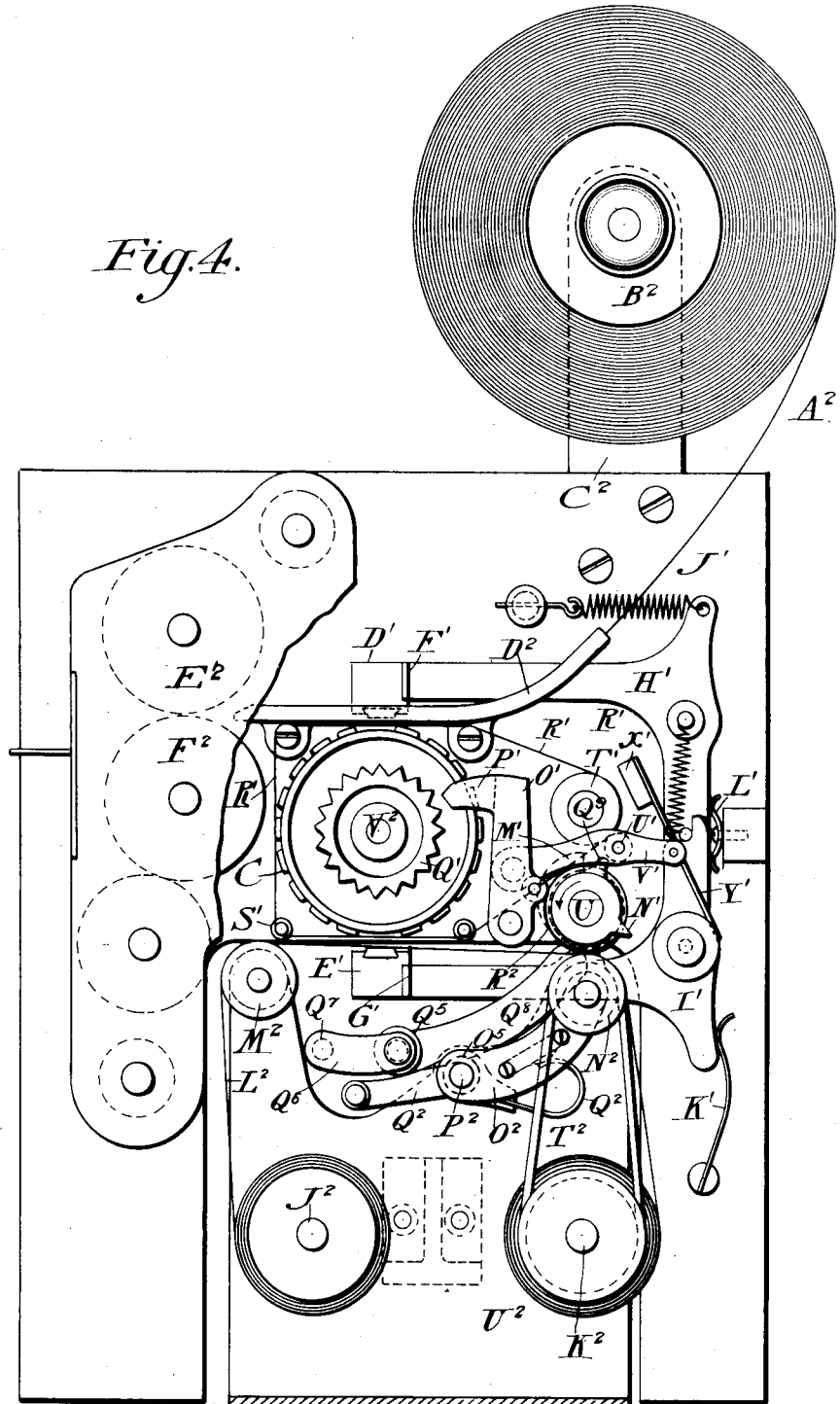

In said drawings Figure 1 is a front elevation of the machine removed from its casing and with its lower left hand corner broken away; Fig. 2, a top plan view of the same; Fig. 3, an enlarged vertical section approximately on the line 3—3 of Fig. 1; Fig. 4, an enlarged elevation of the printing attachment at the right hand of the machine, with part of one of the frame-plates broken away; Fig. 5, an enlarged front elevation of the parts shown in Fig. 4, with the train of rollers at the front of the latter figure removed to expose the parts behind them; Fig. 6; a detail plan view showing the four special keys and coöperating devices; Fig. 7, a corresponding view of the right hand one of said keys and parts adjacent the same; Fig. 8, a front elevation of the four special keys and the sliding plate with which they coöperate; Fig. 9, an enlarged detail vertical section showing the means for advancing the record strip; and Fig. 10, a top plan view of the same with part of one of the rollers broken away.

The same letters of reference are used to indicate identical parts in all the figures.

As seen in Fig. 1 the operating keys of the machine are divided into three sets, the one on the right representing units of cents from one to nine, the middle one tens of cents from ten to ninety, and the left hand one units of dollars from one to nine. These several sets are separated by two special keys marked "Cigars" and "Drugs" respectively, while at the opposite ends of the machine are two other special keys marked "Soda" and "Sundries" respectively. The cash keys and the indicating, registering, and printing mechanisms actuated by them are substantially the same as in the Carney machine above referred to, and may be here briefly described, reference being had to the Carney patent for a more detailed explanation of their construction and operation. Each of the cash keys consists of a simple lever A fulcrumed on the horizontal rod B and resting at its rear end upon the cross bar C of the framework, in the lower end of a vertical slot in the guide-plate D. Resting upon each of said keys is a vertical indicator-rod E carrying an indicator F bearing a number corresponding to that on the finger-button at the front end of the key. Each cash key has pivoted to it a vertical lifter-plate G which coöperates with the cross-rod H of a swinging registering-frame I. There are three of these registering frames, L, J, K, Fig. 2, mounted upon a shaft L journaled at its opposite ends in bearings upon the side-frames of the machine. The lifters G of the right hand set of keys coöperate with the rod H of the frame I, those of the middle set with the rod H of the frame J, and those of the left hand set with the rod H of the frame K. The frames I J are loose upon the shaft L, and the frame K fast upon it. The frame I has secured upon its left hand end a gear-toothed segment M, while the frame J has secured upon its right hand end, adjacent the segment M, a similar segment N, while the shaft L has fast upon it adjacent the segment N a third similar segment O. These segments coöperate respectively with the pinions P of the first, second, and third wheels of a train of registering wheels mounted in a swinging frame Q fulcrumed on a rod R, Fig. 3. By means of levers S connected to the frames Q and coöperating with cams T fast upon a rotary shaft U, Fig. 3, the pinions P are thrown into mesh with the segments at the beginning of the positive strokes of the operated keys and out of mesh with them at the end of such strokes, as fully described in the Carney patent aforesaid, and the lifters G of each set are arranged in such graduated order that the operation of any key in the set will cause its corresponding segment to turn the proper registering wheel the necessary distance to register the value of such key.

Journaled in the framework of the machine immediately in front of the lower ends of the segments is a rock-shaft V which has mounted upon it two sleeves W X, both of which, with the shaft, extend to the right through the side-frame of the machine, as seen in Fig. 5. The sleeve W has fast upon its right hand end a type-wheel A' whose type-numbers represent units of cents, while the sleeve X has fast upon its right hand end the type-wheel B' whose type-numbers represent tens of cents, and the shaft V has fast upon it the type-wheel C' whose numbers represent units of dollars. Each type-wheel bears two sets of type-numbers each representing the nine digits, with interposed ciphers, one set of numbers adapted to cooperate with an impression platen immediately above the wheels and the other with a second platen immediately beneath them. At their left hand ends the sleeves W X have fast upon them pinions Y, Fig. 3, meshing respectively with the segments M N, while the shaft V has fast upon it a third pinion meshing with the segment O. In this manner the operation of any key will cause its corresponding segment to turn the proper type-wheel a sufficient distance to bring to the two printing points its two numbers representing the value of such key, as explained in the patent aforesaid and as will be readily understood.

The impression platens D' E' which coöperate with the type-wheels, Figs. 4 and 5, are carried upon horizontal arms F' G' secured to and extending laterally to the right from the front ends of the forwardly extending arms of a pair of bell-cranks H' I'. These bell-cranks are yieldingly held in normal position by springs J' K' with their vertical arms bearing against a spring stop L'. The two vertical arms of the bell-cranks are so connected by a pin on one and shoulder on the other that when the lower bell-crank is moved to carry its platen E' away from the type-wheels the upper bell-crank will be moved correspondingly to carry its platen away from the wheels, and when the two are released their springs J' K' will throw them quickly back to normal position and the resiliency of the spring stop L' will permit their momentum to carry the platens D' E' against the type-wheels to effect the printing. The bell-cranks are so moved and released by means of a cam M' (dotted lines, Fig. 4,) fast upon the rotary shaft U before referred to and coöperating with a projection upon the upper edge of the horizontal arm of the lower bell-crank I'. During the positive stroke of an operated key the cam will gradually retract the bell-cranks, against the tension of their springs J' K', and at the end of such stroke or beginning of the negative stroke of the key it will clear the projection upon the lower bell-crank and permit the springs to throw them back to normal position and cause the platens to effect the printing. A cam N' also fast upon the rotary shaft U coöperates with an arm O' carrying a series of locking dogs P' coöperating with toothed locking disks Q' upon the respective type-wheels to lock them in position while the platens effect the printing.

The endless inking ribbon R' passes above and below the type-wheels around guides S' and between a roller T' and a second smaller roller U' mounted on a spring-pressed arm V' and bearing against the roller T'. The roller T' is turned intermittently by a connection with the rotary shaft U, which need not be illustrated and described in detail, to advance the inking ribbon at each operation of the machine. An inking pad X' carried by a spring-arm Y' secured to the hub of the lower bell-crank I' at each retraction of the latter bears against the ribbon as it passes over the roller T' and inks it.

At the upper printing point the type-numbers print upon the paper check-strip A² carried in a roll upon the reel B² mounted upon a standard C² and led thence downward and forward through a guide-way D² having an opening above the type-wheels to permit the upper platen to carry the strip against said wheels, and thence on forward between a pair of feed-rollers E² F² and out of the machine. These feed-rollers may be actuated in any suitable manner to advance the check-strip at each operation of the machine. In the Carney patent aforesaid a special operating handle is employed for that purpose, while in a subsequent patent No. 536,015 and dated Mar. 9, 1895 upon the same machine, the feed-rollers are automatically actuated at the return strokes of the keys. Either arrangement may be employed so far as my invention is concerned, and neither need be illustrated or described in detail here.

In the Carney patent 497,861 aforesaid the paper record-strip upon which the type-wheels printed at the lower printing point was a narrow strip carried upon reels or spools mounted in fixed position upon the main frame-plate of the printing attachment, and it was led in a fixed path beneath the type-wheels so that the numbers were printed upon it in successive order one immediately beneath another. Under my improvement the record strip is wide enough to contain several columns, in this instance four, in which the amounts representing sales of different classes may be respectively printed, and it is carried upon a laterally sliding frame which may be shifted from one position to another to bring one column or another beneath the type-wheels according to the character of the sale which has been made. As seen in Fig. 5 this laterally sliding paper carriage consists of an open box or framework $G^2$ composed of a bottom and two vertical sides and resting upon an anti-friction roller $H^2$ mounted in a bracket support $I^2$ secured to the side frame of the machine. In the lower forward part of this carriage is journaled the supply reel $J^2$ for the record-strip, and in the lower rearward portion of the same the storage reel $K^2$. From the reel $J^2$ the strip $L^2$ is led upward over a guide-roller $M^2$ journaled in the carriage $G^2$, thence rearward between the type-wheels and the lower platen $E'$, thence over a second guide-roller $N^2$, and thence downward around the storage reel $K^2$. The roller $N^2$ is journaled in the rear ends of the two side arms $O^2$ of a frame composed of said arms and a sleeve $O^5$ to which their forward ends are rigidly secured, said sleeve being loosely mounted upon a shaft $P^2$ fixed at its left hand end in the carriage $G^2$, Figs. 4, 5, 9, and 10. The sleeve $O^5$ has secured to it a forwardly extending arm $Q^2$ which projects beneath a roller $Q^5$ journaled in a swinging frame $Q^6$ hung upon a shaft $Q^7$ fixed at its left hand end in the main frame plate of the printing mechanism, Fig. 10. The rear end of the left hand side arm $Q^8$ of this frame stands in the path of a cam $Q^9$ fast upon the rotary shaft U beside the cam $M'$, Fig. 4. At each complete revolution of said shaft the cam $Q^9$ will depress the rear end of the arm $Q^8$ and cause the roller $Q^5$ to depress the forward extension $Q^2$ of the side arm $O^2$ of the frame carrying the roller $N^2$, thereby rocking said frame and throwing the roller $N^2$ upward. The shaft U has fast upon it a sleeve or roller $R^2$ which coöperates with the roller $N^2$, the roller $R^2$ in this instance being provided with a series of circumferential ribs or rings, between which and the roller $N^2$ the record strip is compressed when the roller $N^2$ is thrown upward in the manner above explained. Inasmuch as the shaft U and roller $R^2$ are turning constantly during the movement of any one of the cash keys it follows that during the time the cam $Q^9$ is passing the end of the arm $Q^8$ and holding the roller $N^2$ against the roller $R^2$ the record strip will be advanced by the rollers $N^2 R^2$. In this manner at each operation of the machine the record strip will be advanced a short distance to bring a fresh space to the printing point. Except during the time the cam $Q^9$ is passing the end of the arm $Q^8$ the rollers $N^2 R^2$ are separated from each other, so that the roller $N^2$ is free to move laterally with the sliding carriage $G^2$.

The spindle of the roller $N^2$ has fast upon its right hand end a grooved disk $S^2$ around which passes a yielding band $T^2$ which is also passed around a grooved disk $U^2$ fast upon the right hand end of the storage reel $K^2$, and thus at each operation of the machine the reel $K^2$ will be turned to wind up the portion of the record strip advanced by the rollers $N^2 R^2$.

The paper-carriage $G^2$ has secured to its left hand side a horizontal plate $V^2$ extending to the left through an opening in the side-frame of the machine and connected at its extreme left hand end by a slot and pin at $W^2$, Figs. 6 and 7, to the rear end of a horizontal lever $X^2$ fulcrumed at $Y^2$ upon a support $Z^2$ secured upon the left side of the right hand frame plate of the machine. At its forward end this lever is connected by a slot and pin to a laterally sliding plate $A^3$ mounted upon suitable guides upon the rear side of the front cross-bar $B^3$ of the framework. The plate $A^3$ is provided with four inclined slots, one beneath each of the special keys, Fig. 8, and each of said keys has secured to it a pendent arm $C^3$, Fig. 3, carrying an anti-friction roller $D^3$ adapted to travel in the inclined slot beneath it in the plate $A^3$. The slots in the plate $A^3$ upon opposite sides of its middle are inclined in opposite directions, and the two slots upon each side have different inclinations, as seen in Fig. 8, the result being that when one of the keys upon one side of the middle of the plate is depressed the plate will be slid in one direction a given distance and when the other key upon the same side of its middle is depressed the plate will be slid in the same direction a different distance; while the operation of the two keys upon the opposite side of the middle of said plate will slide it different distances in the opposite direction. In this manner the operations of the several special keys will bring the corresponding columns on the record strip beneath the type-wheels, as will be readily understood. The plate $A^3$ and paper carriage are yieldingly held in and returned to their normal middle position by springs $E^3$ connected to said plate and to the cross-bar $B^3$ of the framework, Figs. 6 and 8.

For the purpose of holding the paper carriage in adjusted position after the depression of one of the special keys, while the proper cash keys are being operated to indicate, register and print the amount of the sale, the following devices are employed. Each of the special keys, instead of consisting of a simple lever fulcrumed on a rod B, consists of two levers $F^3$ $G^3$, Fig. 3, hung side by side at their rear and front ends, respectively, upon the rod B. Mounted in guides $H^3$ upon the side of each lever $G^3$ is a sliding latch-plate $I^3$ having a hook adapted to coöperate with the flange $J^3$ upon the lower rear edge of the main vibrating frame $K^3$ which overlies all of the keys of the machine and is lifted by the operation of any one of them in the well-known manner. When the lever $F^3$ of the special key is in normal position the front end of the latch $i^3$ fits in a notch at $L^3$ in the rear end of said lever and is thereby held in normal position against the stress of a spring $M^3$ tending to pull it forward and engage its hook with the flange $J^3$. Whenever the front end of the lever $F^3$ is depressed the front end of the latch $I^3$ will be forced out of the notch $L^3$ and the spring $M^3$ be permitted to pull the latch forward and engage its hook with the flange $J^3$, thereby coupling the lever $G^3$ to the vibrating frame $K^3$ but not moving said lever $G^3$. Fast upon a rock shaft $N^3$ journaled in the framework are four arms $O^3$, one beside each of the special key-levers $F^3$. Each of said levers is provided with two pins or lugs $P^3$ $Q^3$, one in front and the other in rear of the arm $O^3$. The latter is provided with a shoulder $R^3$ adapted to catch under the lug $Q^3$ when the lower end of the arm is swung rearward. The lower forward end of the arm $O^3$ is provided with a notch $S^3$ which coöperates with the pin $P^3$ upon the key-lever $F^3$. When the latter is depressed the pin $P^3$ will bear against the forward side of the arm $O^3$ and press the lower end of the latter rearward until the pin becomes engaged with the notch $S^3$, whereupon the arm $O^3$ will hold the lever in depressed position when released from the hand of the operator, a spring $T^3$ bearing against a plate $U^3$ upon the upper end of one of the arms yieldingly maintaining such engagement of the pin $P^3$ with the notch $S^3$. At such downward movement of the key-lever $F^3$ its lug $Q^3$ will clear the shoulder $R^3$ upon the arm $O^3$ before the latter is thrown rearward by the pin $P^3$, but as all of the other special key-levers remain at rest the shoulders $R^3$ of their coöperating arms $O^3$ will be thrown under their lugs $Q^3$ and thus all of the unoperated special keys will become locked. In this manner upon depressing any one of the special keys it is yieldingly held in depressed position and all of the other special keys are locked, to permit the proper cash keys to be operated to print the amount of the sale in the desired column upon the record strip. The upper rear end of one or more of the arms $O^3$ coöperates with the front end of one or more arms or plates $V^3$, (in this instance four,) secured upon the upper side of the vibrating frame $K^3$, for two purposes. The first one is to lock the cash keys from operation until some one of the special keys has been depressed to shift the paper carriage and to couple one of the levers $G^3$ to the vibrating frame. The rear end of the arm $O^3$ in normal position stands directly in the path of the front end of the plate $V^3$, so that until the arm $O^3$ is rocked away from such position the vibrating frame $K^3$ cannot be lifted and consequently no cash key can be operated. The depression of any one of the special key-levers $F^3$ rocks the arm $O^3$ away from this locking position, in the manner before explained, and releases the vibrating frame and permits the operation of the cash keys. In the second place the contact of the front end of the plate $V^3$ with a shoulder or projection $W^3$ upon the arm $O^3$ at the end of the positive stroke of the cash key and upward movement of the vibrating frame will tilt said frame $O^3$ far enough to disengage its notch $S^3$ from the pin $P^3$ of the depressed lever $F^3$ and thereby release the latter, which thereupon returns to normal position either under the influence of the springs $E^3$ acting upon it through the sliding plate $A^3$, or under the influence of special resetting springs for the keys. After this release of the special key the arm $O^3$ fast upon the shaft $N^3$ will be returned to the normal position shown by the spring $T^3$ as soon as the cash key is released and the vibrating frame and plate $V^3$ returned to their normal position.

The lifting of the vibrating frame by the operation of the cash key or keys will cause the lifting of the special key-lever $G^3$ which has been coupled to said frame in the manner before explained, and consequently the exposure of the special indicator carried by the rod E resting upon the rear end of said lever. Upon the return of the vibrating frame and lever $G^3$ to normal position the front end of the latch $I^3$ will ride over the rear end of the lever $F^3$ beneath the notch $L^3$ and be forced rearward and its hook disengaged from the flange $J^3$, and as it comes opposite the notch $L^3$ its front end will reëngage said notch. The sole purpose of the levers $G^3$ and latches $I^3$ is to provide for the exposure of the special indicators, and so far as the registering and printing mechanisms of the machine are concerned, including the lateral adjustment of the paper-carriage, the special keys may consist of simple levers $F^3$, and the levers $G^3$ and their latches and the indicators operated by them be omitted.

From the foregoing description it will be understood that upon depressing any one of the special key-levers the paper carriage will be shifted to bring the column upon the record strip corresponding to such key beneath the type-wheels, and upon then depressing the proper cash keys to indicate and register the amount of the sale such amount will be printed in the aforesaid column upon the record strip.

So far as I am aware I am the first in the art to mount the record strip in a cash register or recorder upon a movable frame controlled by a series of special keys in such manner that upon the operation of any one of said keys the record strip will be shifted to bring to the printing point its column corresponding to such key so that upon the subsequent operation of the proper cash keys any amount in dollars and cents within the capacity of the machine may be printed in such column. Such being the case my invention is not restricted, in its broader scope, either to the particular construction and arrangement of the parts illustrated and described, or to the special style of machine to which I have shown it applied.

Having thus fully described my invention, I claim:

1. The combination of a series of keys representing different amounts in dollars and cents, type-wheels or carriers coöperating therewith and bearing the types representing similar amounts, a series of special depressible finger keys an impression platen coöperating with said type-carriers to print said amounts upon a paper strip interposed between them, said strip and type-carrier being adjustable in relation to each other to cause the printing of any desired amount within the capacity of the machine to be effected in different columns or spaces, and connections for causing the depressions of the different special keys to adjust the parts to print in different columns corresponding to the particular key operated, substantially as described.

2. The combination of a series of keys representing different amounts in dollars and cents, printing devices coöperating therewith to print said amounts upon a paper strip, said devices comprising a type-wheel or carrier coöperating with said keys and a platen coöperating with said carrier, a movable carriage for the paper strip, and a series of special depressible finger keys and connections between the same and paper carriage for causing the depression of the different special keys to move the carriage to different positions to bring different columns or spaces upon the paper strip into position for printing therein any desired amount within the capacity of the machine, substantially as described.

3. The combination of a series of keys representing different amounts in dollars and cents, printing devices actuated thereby to print said amounts upon a paper strip, said printing devices comprising a type-wheel or carrier adapted to be turned to different positions by the operation of the different keys and a platen coöperating therewith, a movable carriage for the paper strip, and a series of special depressible finger keys and connections between the same and paper carriage for causing the depressions of different keys to move the carriage to different positions to bring different spaces or columns upon the paper strip to the printing point to receive an imprint of any amount within the capacity of the machine, substantially as described.

4. The combination of a series of keys representing different amounts, printing devices coöperating therewith to print said amounts upon a paper strip, a movable carriage for said paper strip yieldingly held in a given normal position, a series of special keys and connections for moving said carriage to bring different columns or spaces upon the paper-strip to the printing point, means for holding the carriage in such adjusted positions during the operation of the amount keys, and means actuated by the latter to release the frame and permit it to return to normal position, substantially as described.

5. The combination of a series of keys representing different amounts, printing devices actuated thereby to print said amounts upon a paper strip, a movable carriage for said strip, a spring operating to yieldingly hold said carriage in and return it to normal position, a series of special keys and connections for moving said carriage to different positions to bring different columns or spaces upon the record-strip to the printing point, a latch for holding the carriage in its adjusted positions, and a trip for said latch actuated by the operation of the amount keys to release the paper-carriage and permit its spring to return it to normal position, substantially as described.

6. The combination of a series of keys representing different amounts, a registering mechanism coöperating therewith to add the values of the operated keys into a common total, printing devices coöperating with the keys to separately print upon a paper strip the amounts registered at the different operations of the machine, a movable carriage for the paper strip, and a series of independently movable special keys representing different departments and connections between the same and paper carriage for causing the operations of different special keys to move the carriage to different positions to bring different spaces or columns upon the paper strip to the printing point, whereby an aggregate registration of all the operations of the machine and a special record of each particular class of sales may be preserved.

7. The combination of a series of keys representing different amounts in dollars and cents, a registering mechanism coöperating therewith to add the values of the operated keys into a common total, a type-wheel or carrier coöperating with said keys and a platen coöperating with the carrier to print the values of the keys upon a paper strip passed between the carrier and platen, said strip and type-carrier being adjustable in relation to each other to cause the printing of any desired amount within the capacity of the machine to be effected in different columns or spaces upon the strip, and a series of special keys and connections for causing the operations of the different keys to adjust the parts to print in different columns corresponding to the particular key operated, whereby an aggregate registration of all the operations of the machine and a special record of each particular class of sales may be preserved.

8. The combination of a series of keys representing different amounts in dollars and cents, a registering mechanism coöperating therewith to add the values of the operated keys into a common total, a type-wheel or carrier coöperating with the keys and bearing types representing their respective values, a platen coöperating with the type-carrier to print said values upon a paper strip passed between them, a movable carriage for said strip, and a series of special keys and connections between the same and paper carriage for causing the operations of different keys to move the carriage to different positions to bring the different spaces or columns upon the strip to the printing point to receive an imprint of any amount within the capacity of the machine, substantially as described.

9. The combination of a series of keys representing different amounts in dollars and cents, a type-wheel or carrier coöperating therewith and bearing the types representing the corresponding amounts, an impression platen coöperating with said carrier to print said amount upon a paper strip passed between them, a movable carriage for said strip, a reciprocating plate connected to said carriage and provided with a series of inclined slots, and a series of special keys carrying projections coöperating with the slots in said plate to move the paper carriage to different positions to bring different spaces or columns upon the paper strip to the printing point to receive an imprint of any amount within the capacity of the machine, substantially as described.

10. The combination of a series of keys representing different amounts, printing devices coöperating therewith to print said amounts upon a paper strip, a movable carriage for said strip, a reciprocating plate connected to said carriage and provided with a series of inclined slots, a series of special keys carrying projections coöperating with the slots in said plate to shift the carriage to different positions to bring different columns upon the record strip to the printing point, means for holding the special keys in operated position while the cash keys are being operated, and means actuated by the cash keys to release the special keys, substantially as described.

11. The combination of a series of keys representing different amounts, printing devices coöperating therewith to print said amounts upon a paper strip, a movable carriage for said strip, a reciprocating plate connected to said carriage and provided with a series of inclined slots, a series of special keys having pendent arms carrying anti-friction rollers coöperating with the slots in said plate, the rock-shaft having fast upon it the arms coöperating with pins upon the special keys to hold the latter in depressed position, and the vibrating frame having a projection operating to trip said arms and release the special keys upon the operation of the cash keys, substantially as described.

12. The combination of a series of keys representing different amounts, a vibrating frame common to said keys and moved by the operation of any one of them, a series of special keys each composed of two independent arms or levers, and latches carried by one set of arms of the special keys and controlled by the other set of arms thereof for coupling the arms which carry them to the vibrating frame, substantially as described.

13. The combination of a series of keys representing different amounts, special keys, printing devices coöperating with the keys and constructed to print the amounts in separate columns upon a paper strip so that they may be added up in departments, means controlled by the special keys for determining the department for the amount to be printed, and devices for preventing the operation of the amount keys until after a special key has been operated.

14. The combination of a series of keys representing amounts, a type wheel or carrier bearing types representing similar amounts, a platen coöperating with said type carrier to print said amounts in separate columns upon a paper strip passed between them, a series of special keys, means controlled by the special keys for designating the department for each amount printed, and means for preventing the operation of the amount keys until after a special key has been operated.

15. The combination with a series of keys representing different amounts, a registering mechanism coöperating therewith to add the values of the operated keys, printing devices coöperating with the keys to separately print in separate columns upon a paper strip the different amounts registered at the different operations of the machine, a series of special keys, means controlled by the special keys for designating a department for the amount printed, and means for preventing the operation of the amount keys until a special key has been operated.

16. The combination with a series of keys representing different amounts, a registering mechanism coöperating therewith to add the values of the operated keys into a common total, a type wheel or carrier also coöperating with said keys and bearing types representing their different values, a platen coöperating with the type carrier, a series of special keys, means controlled by the special keys for adjusting a record strip so that the amounts are printed in different columns, and means for preventing the operation of the amount keys until one of the special keys is operated.

17. The combination of a series of keys representing different amounts, printing devices coöperating therewith to print said amounts upon a paper strip, said strip and printing devices being adjustable in relation to each other to cause the printing to be effected in different columns or spaces upon the strip, a series of special depressible finger keys and connections for causing the depressions of the different keys to adjust the parts to print in different columns corresponding to the particular special key operated, and means controlled by said special keys for preventing operation of the amount keys until after a special key has been operated, substantially as described.

18. The combination of a series of keys representing different amounts, a registering mechanism coöperating therewith to add the values of the operated keys into a common total, printing devices also coöperating with said keys to separately print upon a paper strip the amounts registered at the different operations of the machine, said paper strip and printing devices being adjustable in relation to each other to cause the printing to be effected in different columns or spaces upon the strip, a series of special keys and connections for controlling such adjustment, and means controlled by said special keys for preventing operation of the amount keys until after a special key has been operated, substantially as described.

19. The combination of a series of keys representing different amounts, printing devices coöperating therewith to print said amounts upon a paper strip, a movable carriage for said strip, a series of special depressible finger keys and connections for moving said carriage to bring different columns or spaces upon said strip into position for printing, and means controlled by said special keys for preventing operation of the amount keys until after a special key has been operated, substantially as described.

20. The combination of a series of keys representing different amounts, a registering mechanism coöperating therewith to add the values of the operated keys into a common total, printing devices also coöperating with said keys to print their values upon a paper strip, a movable carriage for said strip, a series of special keys and connections for moving said carriage to bring different columns or spaces upon the strip into position for printing, and means controlled by said special keys for preventing operation of the amount keys until after a special key has been operated, substantially as described.

21. The combination of a series of keys representing different amounts, a vibrating frame common to said keys and moved by the operation of any one of them, a series of special keys, and means controlled by said special keys for locking the vibrating frame and preventing movement of it by the cash keys until after a special key has been operated, substantially as described.

22. The combination of the key levers $F^3$ provided with the projections $P^3 Q^3$, and the arms $O^3$ fast upon the rock-shaft $N^3$ and having the notches $S^3$ and shoulders $R^3$ coöperating with the projections $P^3 Q^3$, respectively, substantially as described.

23. The combination of the key levers A, the vibrating frame $K^3$ common thereto, the key-levers $F^3$ having the projections $P^3 Q^3$, the arms $O^3$ fast upon the rock-shaft $N^3$ and having the notches $S^3$ and shoulders $R^3$ coöperating with the projections $P^3$ and $Q^3$, and the trip $V^3$ upon the vibrating frame coöperating with the arms $O^3$ to release the key-levers $F^3$, substantially as described.

24. The combination of the key-levers A, the vibrating frame $K^3$ common thereto, the key-levers $F^3$ having the projections $P^3$, and the arms $O^3$ fast upon the rock-shaft $N^3$ and coöperating with the projections $P^3$ and with the vibrating frame to lock and release the latter, substantially as described.

25. The combination of the key-levers A, the vibrating frame $K^3$ common thereto, the special keys composed of the levers $F^3 G^3$ hung at their adjacent ends upon the fulcrum of the levers A, the latches $I^3$ carried by the levers $G^3$ and coöperating with the rear ends of the levers $F^3$, and the springs $N^3$ for engaging the latches with the vibrating frame when the levers $F^3$ are depressed, substantially as described.

26. The combination of the key-levers A, the vibrating frame $K^3$ common thereto, the special keys composed of the levers $F^3 G^3$ hung at their adjacent ends upon the fulcrum rod of the levers A, the latches $I^3$ carried by the levers $G^3$ and coöperating with the vibrating frame $K^3$ and with the rear ends of the levers F³, the arms O³ fast upon the rock-shaft N³ coöperating with the pins P³ upon the levers F³ and with the plate or plates V³ upon the vibrating frame, substantially as described.

27. The combination with a series of keys representing different amounts, a registering mechanism coöperating therewith, to add the values of the operated keys into a grand total, a printer coöperating with the keys for printing the amounts in columns, a series of special keys controlling the column printing, and means for preventing the registration and printing by the amount keys until a special key is operated.

28. In a cash register, the combination with a series of amount keys, a printing mechanism arranged to print the amounts in columns, a series of special keys for determining the column, and means controlled by the special keys for preventing the printing operation until after a special key is operated.

29. In a machine of the character described, the combination with amount determining means and typecarriers corresponding thereto, of a movable carriage carrying a paper strip for receiving an impression from said typecarriers, and a series of depressible special keys with connections for setting said carriage differentially to print in any desired column any amount within the capacity of the machine.

30. In a machine of the character described, the combination with amount determining means and typecarriers controlled thereby, of a movable carriage carrying a paper for receiving an impression from said typecarriers, special manipulative means for moving said carriage to print in any desired column, and means controlled by said amount determining means for automatically restoring the carriage to normal position.

31. In a machine of the character described, the combination with amount determining means and typecarriers controlled thereby, of a movable carriage for carrying a paper strip for receiving an impression from said typecarriers, and a series of special depressible keys and connections for positively moving said carriage to position the same for the printing in any desired column of any amount within the capacity of the machine.

32. In a machine of the character described, the combination with amount determining means and typecarriers controlled thereby, of a movable carriage for supporting a paper strip for receiving an impression from said typecarriers, and a series of depressible keys and connections for positively moving said carriage to set the same for printing in any desired column and for positively limiting said setting movement.

33. In a machine of the character described, the combination with amount determining means and typecarriers controlled thereby, of movable carriers for carrying a paper strip for receiving an impression from said typecarriers, of special manipulative means for moving said carriage differentially to position the same for printing in any desired column, and means for automatically restoring said carriage to normal position after such printing but at the same operation of the machine in which the carriage was shifted.

34. In a machine of the character described, the combination with amount determining means and typecarriers controlled thereby, of a movable carriage for carrying a paper strip for receiving an impression from said typecarriers, a yielding device for retaining said carriage in normal position, means for shifting said carriage against the tension of said yielding device for printing in a column displaced from the normal column of printing, and means for automatically causing said carriage to be restored to normal position after such printing has taken place but at the same operation of the machine in which the carriage was shifted.

35. In a machine of the character described, the combination with amount determining means and typecarriers controlled thereby, of a movable carriage for carrying a paper strip for receiving an impression from said typecarriers, a yielding device for retaining said carriage in normal position, means for shifting said carriage against the tension of said yielding device for printing in a column displaced from the normal column of printing, means for latching the carriage in shifted position, and means for tripping said latch upon the operation of the machine whereby to permit the yielding device to restore the carriage to normal position.

36. In a machine of the character described, the combination with amount keys, of type carriers set thereby, a movable paper carriage, special keys for differentially moving the same, and springs for resetting the carriage at each operation to normal position.

37. In a machine of the character described, the combination with amount keys, of type carriers set thereby, a movable paper carriage, special keys for differentially moving the same, means compelling the operation of the special key before an amount key can be operated, and means for resetting the carriage to normal at each operation.

38. In a machine of the character described, the combination with amount keys, of type carriers controlled thereby, an operating element, a paper carriage, means for shifting the same, and friction rollers connected with the operating elements for automatically feeding the paper in any shifted position of the carriage.

39. In a machine of the character described, the combination with amount keys, of type carriers controlled thereby, a paper carriage, feeding means comprising a roller, and a second roller thrown into frictional contact with the first roller during part of the operation of the machine.

40. In a machine of the character described, the combination with amount keys, of type carriers controlled thereby, a paper carriage shiftable laterally to print in columns, feeding means, including a roller mounted in the carriage, a roller mounted in the machine frame, and means to bring the said rollers into frictional contact in any position of the carriage at each operation.

41. In a machine of the character described, the combination with amount determining devices, of a printing mechanism controlled thereby, a special manipulative device, a paper carriage, operating connections from said special device to said carriage, said connections adapted to move the carriage in different directions and to different extents, and springs for returning the carriage in either direction to normal position at each operation of the machine.

42. In a machine of the character described, the combination with amount keys, of a printing mechanism controlled thereby, a paper carriage and special devices for positively moving said carriage, means for locking the special devices when operated and thereby locking the carriage, and means operated by the depression of the amount keys for releasing said special devices.

43. In a machine of the character described, the combination with amount keys, of type carriers controlled thereby, a paper carriage, special manipulative devices for shifting the same in reverse directions from normal, and springs for returning said carriage to normal intermediate position at each operation of the machine.

44. In a cash register, the combination with manipulative amount determining devices, of a printing mechanism, a record material carrying device, means for adjusting said device to bring any desired portion of the record material into coöperative relation with the printing mechanism, and a lock for the amount determining devices controlled by said adjusting means.

JOSEPH P. CLEAL.

Witnesses:
IRA BERKSTRESSER.
WM. H. MUZZY.